(12) United States Patent
Swanson et al.

(10) Patent No.: US 9,977,046 B2
(45) Date of Patent: May 22, 2018

(54) PINCH CONTACT SWITCH FOR DETERMINING BENDING SURFACE STATES

(71) Applicant: THE UNITED STATES OF AMERICA AS REPRESENTED BY THE SECRETARY OF THE NAVY, Washington, DC (US)

(72) Inventors: Paul D. Swanson, San Diego, CA (US); Andrew Wang, San Diego, CA (US); Charles H. Tally, IV, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 164 days.

(21) Appl. No.: 15/231,662

(22) Filed: Aug. 8, 2016

(65) Prior Publication Data

US 2018/0038886 A1  Feb. 8, 2018

(51) Int. Cl.
| | | |
|---|---|---|
| *G01P 15/135* | (2006.01) |
| *G01P 15/097* | (2006.01) |
| *G01P 15/16* | (2013.01) |
| *G01P 15/08* | (2006.01) |

(52) U.S. Cl.
CPC ........ *G01P 15/135* (2013.01); *G01P 15/0802* (2013.01); *G01P 15/097* (2013.01); *G01P 15/16* (2013.01); *G01P 2015/0805* (2013.01)

(58) Field of Classification Search
CPC ...... G01P 15/02; G01P 15/08; G01P 15/0802; G01P 2015/0805; G01P 2015/0811; G01P 15/097; G01P 15/135; B81B 3/00; B81B 3/0097; B81B 2201/0235
USPC ............... 73/514.01, 514.15, 514.16, 514.29
See application file for complete search history.

(56) References Cited

U.S. PATENT DOCUMENTS

| | | | |
|---|---|---|---|
| 8,427,249 B1 | 4/2013 | Swanson et al. | |
| 8,490,462 B2 | 7/2013 | Swanson et al. | |
| 8,650,955 B2 | 2/2014 | Tally et al. | |
| 8,689,631 B1 | 4/2014 | Waters et al. | |
| 8,991,250 B2 | 3/2015 | Waters et al. | |
| 9,103,673 B2 | 8/2015 | Swanson et al. | |
| 9,128,496 B2 | 9/2015 | Waters et al. | |
| 9,157,814 B2 | 10/2015 | Swanson et al. | |
| 2007/0039387 A1* | 2/2007 | Jouanet | G01P 13/00 73/510 |
| 2007/0186642 A1* | 8/2007 | Sano | A61B 5/0053 73/172 |
| 2012/0326700 A1 | 12/2012 | Swanson et al. | |
| 2016/0003694 A1* | 1/2016 | Koo | G01L 5/161 73/774 |

* cited by examiner

*Primary Examiner* — Benjamin Schmitt
(74) *Attorney, Agent, or Firm* — SPAWAR Systems Center Pacific; Kyle Eppele; Ryan Friedl (57) ABSTRACT

A device includes two electrically isolated metalized posts attached in close proximity to each other on a bendable substrate. When the bendable substrate bends concavely with respect to the surface onto which the posts are mounted, the distance between the tops of the two posts decreases. At a fixed bending curvature, the two posts will meet and complete an electrical circuit. The posts comprise a flexible material so that the meeting of the posts has minimal effect on the spring constant or damping coefficient of the harmonic oscillation.

19 Claims, 10 Drawing Sheets

PINCH CONTACT SWITCH FOR DETERMINING BENDING SURFACE STATES

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5120; email: ssc_pac_t2@navy.mil. Reference Navy Case No. 102,584.

BACKGROUND

Some conventional systems for detecting motion use a time domain switched inertial sensor that employs tunneling proximity switches. The purpose is to detect motion without inhibiting the motion. The system notes when a mass on a spring harmonic oscillator under the influence of external inertial forces passes known displacement locations. The technology requires a digital trigger when the oscillating proof mass passes the known locations. Some of these proximity switches create pA to nA signals, which require amplification before they can be used as digital triggers.

SUMMARY

The disclosed embodiments relate to a micro-electrical-mechanical system (MEMS) device including an input terminal, an output terminal, a support structure and a flexible bridge portion. The input terminal receives a received electrical input. The output terminal outputs an electrical output. The support structure has a first support end and a second support end. The flexible bridge portion has a first end disposed at the first support end, has a second end disposed at the second support end and in electrical connection with the output terminal, and has a length from the first end to the second end. The flexible bridge includes: a flexible substrate having a top surface; a first non-conductive post disposed normal the top surface; a second non-conductive post disposed normal on the top surface at distance d from the first non-conductive post; a first conductive layer covering the top surface from the first end to a portion of the first non-conductive post and in electrical connection with the input terminal; and a second conductive layer covering the top surface from the second end to a portion of the second non-conductive post and in electrical connection with the output terminal. The first non-conductive post includes a first mounting end disposed at the top surface and a first top end separated from the mounting end, wherein the first top end is covered by the first conductive layer. The second non-conductive post includes a second mounting end disposed at the top surface and a second top end separated from the mounting end, wherein the second top end is covered by the second conductive layer. When the flexible bridge concavely bends with respect to the top surface by a predetermined curvature, C, the first conductive layer on the first top end electrically connects with the second conductive layer on the second top end.

DETAILED DESCRIPTION OF THE INVENTION

A device is needed that provides a large enough current to go directly to a time-to-digital-converter (TDC) without amplification and with minimum perturbation on the motion of the oscillating mass.

Aspects of the disclosed embodiments provide an oscillating accelerometer that provides a large enough current to go directly to a TDC without amplification and with minimum perturbation on the motion of the oscillating mass.

One way to measure acceleration is with a mass on a spring (or cantilever). The total deflection of the mass on the spring will functionally relate to the amount of acceleration influencing the mass and spring. In such a case, the amount of acceleration is based on a signal related to the amount of deflection of the spring.

Another way to measure acceleration using a mass on a spring is to intentionally oscillate the mass on the spring. Acceleration in the direction of the oscillation will affect the timing of when the mass passes known locations in the oscillation. Curve fitting these time deviations of the mass passing the known locations in the oscillation with known timing of the mass passing the known locations in the oscillation in the absence of acceleration will yield a detected amount of acceleration. In such a case, the amount of acceleration is based on time intervals (and changes thereof) of a signal related to the amount of deflection of the spring.

Figure 1:
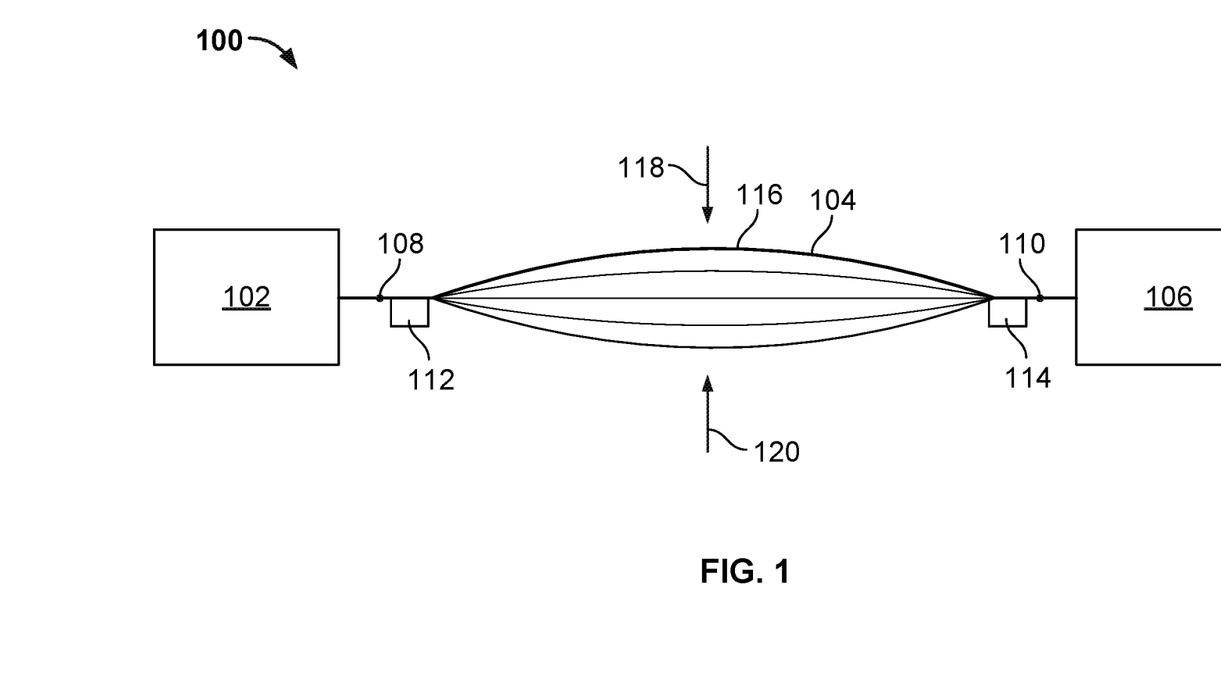
FIG. 1 illustrates a conventional oscillating accelerometer.

An example method of detecting acceleration with active oscillation of the mass on a spring will be further described with reference to FIGS. 1-2. FIG. 1 illustrates a theoretical oscillating accelerometer 100. As shown in the figure, oscillating accelerometer 100 includes a driver 102, a flexible bridge portion 104, a processor 106, an input terminal 108, an output terminal 110, a support 112 and a support 114.

Driver 102 is arranged to electrically connect to input terminal 108, which is additionally arranged to electrically connect to flexible bridge portion 104. Flexible bridge portion 104 is additionally arranged to electrically connect to output terminal 110, which is additionally arranged to electrically connect to processor 106. Support 112 is arranged to support one end of flexible bridge portion 104, whereas support 114 is arranged to support the other end of flexible bridge portion 104. In this manner, flexible bridge portion 104 is suspended between support 112 and support 114.

Driver 102 may be any system or device that is able to actively oscillate flexible bridge portion 104. The active oscillation may be performed by any known method, non-limiting examples of which include magnetically and electrically, for example by way of a piezoelectric transducer.

Flexible bridge portion 104 may be any material that is able to harmonically oscillate between support 112 and support 114. Input terminal 108 may be any terminal that is able to transfer a driving signal from driver 102 to flexible bridge portion 104. Output terminal 110 may be any terminal that is able to transfer a signal from flexible bridge portion 104 to processor 106. Processor 106 may be any system or device that is able to determine when flexible bridge portion 104 passes through known locations.

The oscillating motion of flexible bridge portion 104 will now be further described with reference to FIG. 2. FIG. 2 illustrates a graph 200 of displacement of flexible bridge portion 104 of oscillating accelerometer 100 as a function of time. As shown in the figure, graph 200 includes a y-axis 202, and an x-axis 204, a function 206, a function 208, a function 210 and a dashed line 212. Y-axis 202 corresponds to distance from a resting position of flexible bridge portion 104 between support 112 and support 114. X-axis 204 corresponds to time.

Returning to FIG. 1, consider a first situation wherein no acceleration is influencing flexible bridge portion 104. In such a case, flexible bridge portion 104 oscillates in accordance with the driving signal provided by driver 102. Now, consider a point centrally located on flexible bridge portion 104. This centrally located point will oscillate up and down. This movement is illustrated in graph 200 of FIG. 2 as function 206.

Figure 2:
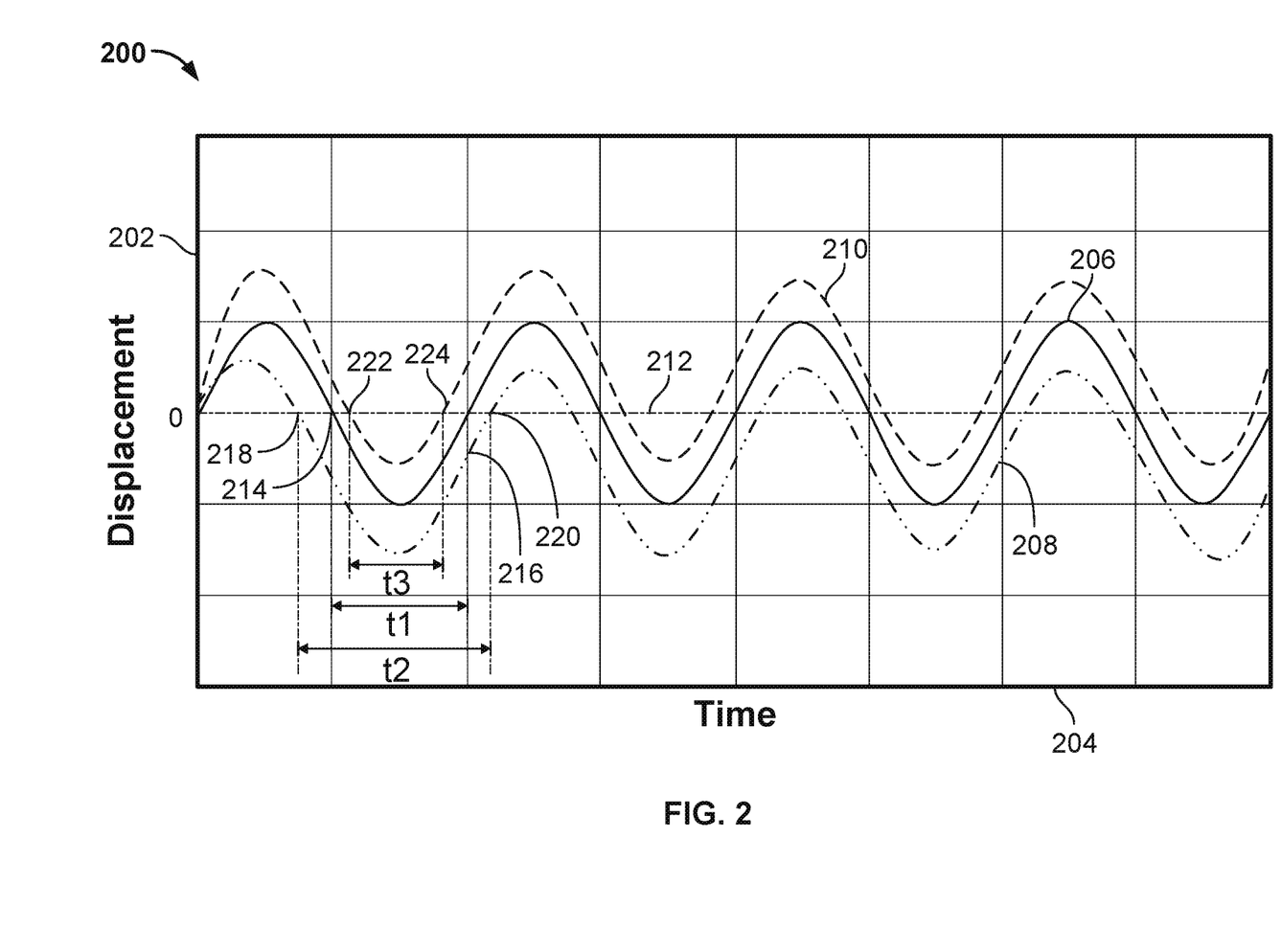
FIG. 2 illustrates a graph of amplitude as a function of time of displacement of the flexible bridge portion of the oscillating accelerometer of FIG. 1.

Returning to FIG. 1, let a position 116 be at the center of flexible bridge portion 104 between support 112 and support 114 correspond to a distance of zero in graph 200 of FIG. 2. When there is no external acceleration influencing flexible bridge portion 104, position 116 will oscillate equally between a maximum distance (a maximum positive distance) and a minimum distance (maximum negative distance) with respect to an axis between support 112 and support 114. For purposes of evaluating the oscillation, let the time period for which position 116 falls below the axis between support 112 and support 114 be $t_1$. As shown in FIG. 2, $t_1$ corresponds to the distance between point 214, where function 206 crosses dashed line 212, and point 216, where function 206 again crosses dashed line 212.

Now consider a second situation where a negative external acceleration influences flexible bridge portion 104. For example, as shown in FIG. 1, a negative external acceleration having a particular magnitude is indicated by arrow 118.

When there is a negative external acceleration influencing flexible bridge portion 104, position 116 will not oscillate equally between a maximum distance and a minimum distance with respect to the axis between support 112 and support 114. This movement is illustrated in graph 200 of FIG. 2 as function 208. For example as shown in FIG. 2, the axis between support 112 and support 114 is effectively shifted further below dashed line 212. Accordingly, position 116 will oscillate such that the positive distance with respect to the axis between support 112 and support 114 is much less than the negative distance with respect to the axis between support 112 and support 114.

For purposes of evaluating the oscillation, let the time period for which position 116 falls below the axis between support 112 and support 114 be $t_2$. As shown in FIG. 2, $t_2$ corresponds to the distance between point 218, where function 208 crosses dashed line 212, and point 220, where function 208 again crosses dashed line 212. By comparing $t_1$ with $t_2$, in theory, processor 106 may be able to measure the magnitude of acceleration 118.

Now consider a third situation where a positive external acceleration influences flexible bridge portion 104. For example, as shown in FIG. 1, a positive external acceleration having a particular magnitude is indicated by arrow 120.

When there is a positive external acceleration influencing flexible bridge portion 104, position 116 will not oscillate equally between a maximum distance and a minimum distance with respect to the axis between support 112 and support 114. This movement is illustrated in graph 200 of FIG. 2 as function 210. For example as shown in FIG. 2, the axis between support 112 and support 114 is effectively shifted further above dashed line 212. Accordingly, position 116 will oscillate such that the positive distance with respect to the axis between support 112 and support 114 is much greater than the negative distance with respect to the axis between support 112 and support 114.

For purposes of evaluating the oscillation, let the time period for which position 116 falls below the axis between support 112 and support 114 be $t_3$. As shown in FIG. 2, $t_3$ corresponds to the distance between point 222, where function 210 crosses dotted line 212, and point 224, where function 210 again crosses dotted line 212. By comparing $t_1$ with $t_3$, in theory, processor 106 may be able to measure the magnitude of acceleration 120.

A problem with oscillating accelerometer 100 is that there is no conventional manner to effectively, accurately, and in real time measure the magnitudes of accelerations 118 and 120. For one reason, any generated signal associated with the oscillation has required amplification for use as a digital trigger. Such amplification introduces lag and noise in the system.

As mentioned previously, what is needed is a switch that provides a large enough current to go directly to a TDC without amplification and with minimum perturbation on the motion of the oscillating mass.

Figure 3:
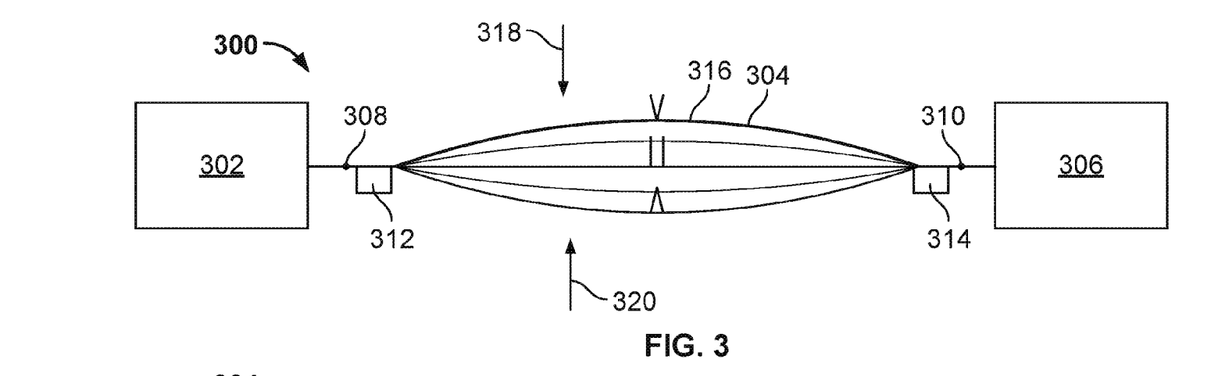
FIG. 3 illustrates an example oscillating accelerometer in accordance with aspects of the disclosed embodiments.

Aspects of the disclosed embodiments utilize curvature of a suspended bendable surface during oscillation to detect acceleration. Aspects of the disclosed embodiments will now be further described with reference to FIGS. 3-9. FIG. 3 illustrates an example oscillating accelerometer 300 in accordance with aspects of the disclosed embodiments. As shown in the figure, oscillating accelerometer 300 includes a driver 302, a flexible bridge portion 304, a processor 306, an input terminal 308, an output terminal 310, a support 312 and a support 314.

Driver 302 is arranged to electrically connect to input terminal 308, which is additionally arranged to electrically connect to flexible bridge portion 304. Flexible bridge portion 304 is additionally arranged to electrically connect to output terminal 310, which is additionally arranged to electrically connect to processor 306. Support 312 is arranged to support one end of flexible bridge portion 304, whereas support 314 is arranged to support the other end of flexible bridge portion 304. In this manner, flexible bridge portion 304 is suspended between support 312 and support 314. A center location 316 of flexible bridge portion 304 is centrally located between support 312 and support 314.

Flexible bridge portion 304 may be any material that is able to oscillate about an axis between support 312 and support 314. Input terminal 308 may be any terminal that is able to provide an oscillating driving signal and an electrical signal to flexible bridge portion 304.

Output terminal 310 may be any terminal that is able to provide an electrical signal to processor 306. Processor 306 may be any system or device that is able to determine an acceleration that is influencing flexible bridge portion 304 based on the electrical signal provided by output terminal 310.

Figure 4:
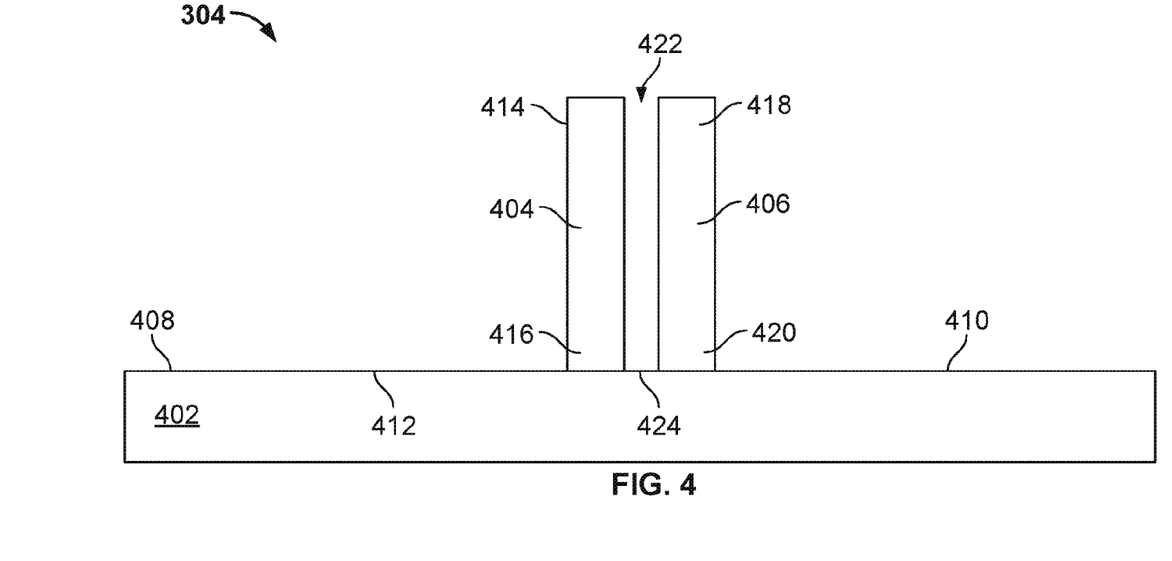
FIG. 4 illustrates an exploded view of a flexible bridge portion of the example oscillating accelerometer of FIG. 3 in a linear position.

The function of flexible bridge portion 304 will now be further described with reference to FIGS. 4-5. FIG. 4 illustrates an exploded view a portion of flexible bridge portion 304 in a linear position. As shown in the figure, flexible bridge portion 304 includes a bendable substrate 402, a post 404, a post 406, a conductive layer 408 and a conductive layer 410. Bendable substrate 402 has a top surface 412. Post 404 includes a top portion 414 and a bottom portion 416, whereas post 406 includes a top portion 418 and a bottom portion 420.

Bendable substrate 402 is arranged to be supported between support 312 (not shown) and support 314 (not shown). Post 404 and post 406 are each disposed normal to top surface 412. Post 404 is disposed a distance from post 406 such that an air gap 422 separates top portion 414 from top portion 418, and such that a gap 424 separates bottom portion 416 from bottom portion 420. Conductive layer 408 is disposed so as to cover a portion of top surface 412 from input terminal 308 (not shown) to post 404, but not the entirety of gap 424. Conductive layer 410 is disposed so as to cover a portion of top surface 412 from output terminal 310 (not shown) to post 406, but not the entirety of gap 424 such that conductive layer 408 is electrically disconnected from conductive layer 410.

Bendable substrate 402 may be non-conducting material that can oscillate about an axis between support 312 and support 314. Each of post 404 and post 406 may be any flexible material that does not affect the motion of bendable substrate 402. Non-limiting examples of materials of post 404 and 406 include a polyimide or other flexible material that is non-conducting. In some embodiments, post 404 and post 406 are the same material as bendable substrate 402.

Each of conductive layer 408 and conductive layer 410 may be any conductive material, non-limiting examples of which include Ag, Au, Cu, Al and combinations thereof. In this position, the lack of a conductor in gap 424 creates an open circuit between conductive layer 408 and conductive layer 410. As such, as shown in FIG. 3, no electrical signal from input terminal 308 can be conducted to output terminal 314. When the curvature of bendable substrate 402 is sufficiently large, post 404 touches post 406 to conduct current. This will be described in greater detail with reference to FIG. 5.

Figure 5:
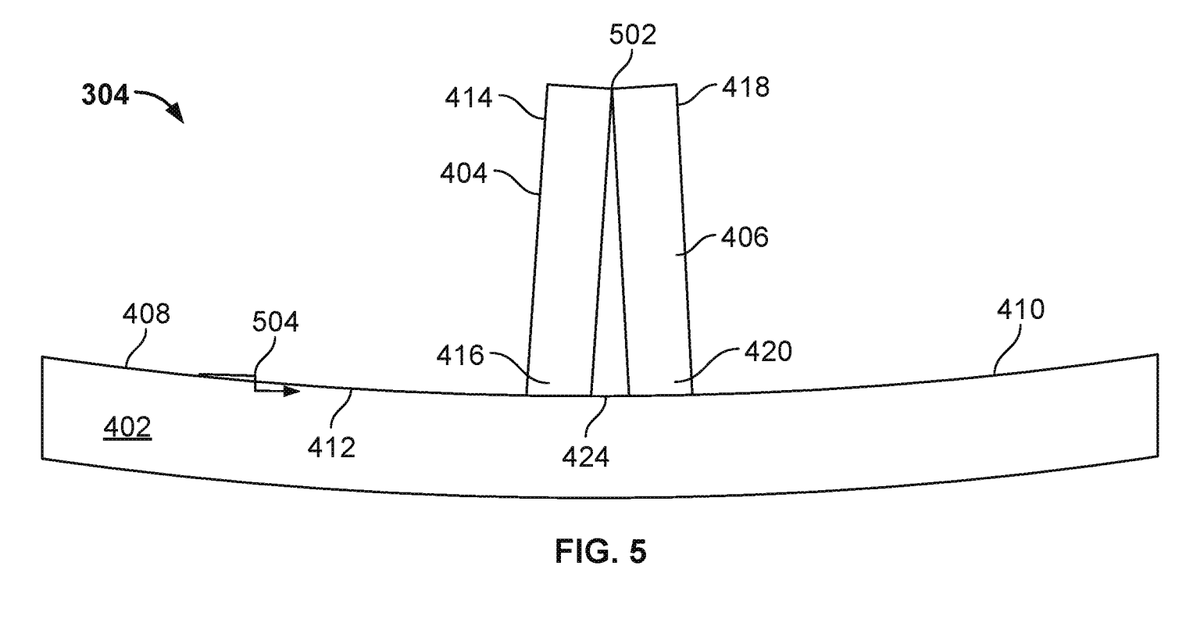
FIG. 5 illustrates an exploded view of the flexible bridge portion of the example oscillating accelerometer of FIG. 3 in a concave position.

FIG. 5 illustrates an exploded view flexible bridge portion 304 in a concave position.

As shown in the figure, when flexible bridge portion 304 has sufficient negative curvature, top portion 414 of post 404 touches top portion 418 of post 406. Consequently, conductive layer 408 on top portion 414 touches conductive layer 410 on top portion 418. As such, as shown in FIG. 3, an electrical signal from input terminal 308 can be conducted to output terminal 314, which may then be analyzed by processor 306.

In many conventional "contact" switches, a phenomenon called "contact bounce" occurs when the two contact points meet. In this invention the contact points are on the top of two posts made out of flexible material, designed to eliminate contact bounce and to minimize the perturbation of the switch contact in the spring constant and damping of the bending surface.

Contact bounce (also called chatter) is a common problem with mechanical switches and relays. Switch and relay contacts are usually made of resilient metals. When the contacts strike together, their momentum and elasticity act together to cause them to bounce apart one or more times before making steady contact. The result is a rapidly pulsed electric current instead of a clean transition from zero to full current. The effect is usually unimportant in power circuits, but causes problems in some analogue and logic circuits that respond fast enough to misinterpret the on-off pulses as a data stream. A switch formed by post 406 and post 408 does not exhibit contact bounce.

In an example embodiment, oscillating accelerometer 300 is able to detect acceleration based on a deviation of the oscillation of flexible bridge portion 304. This will be described in greater detail with reference to FIGS. 6A-C.

Figure 6A:
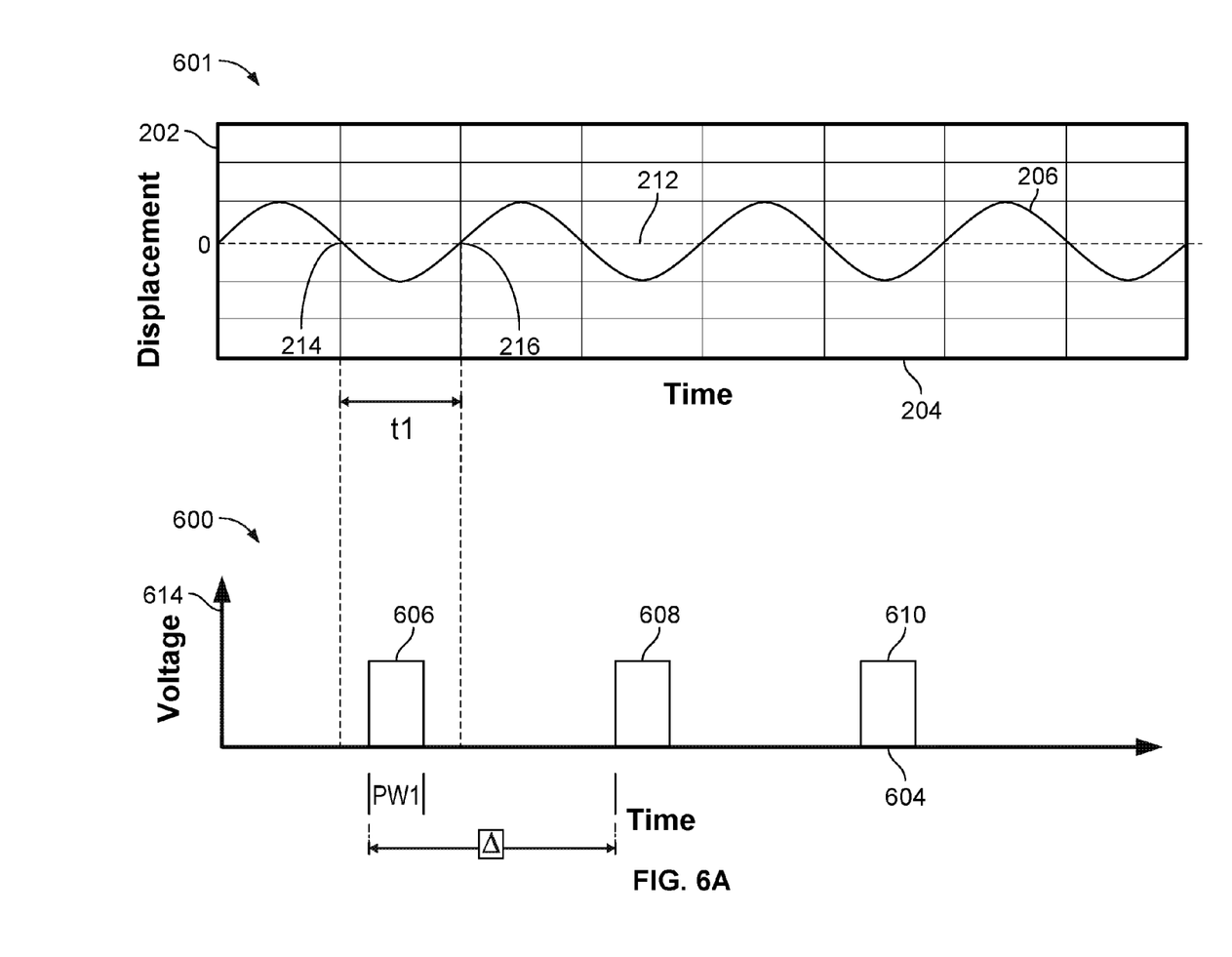
FIG. 6A illustrates the graph of amplitude as a function of time of displacement of the flexible bridge portion of the oscillating accelerometer of FIG. 1 and the pulse signal of the example oscillating accelerometer of FIG. 3 with no externally applied acceleration.

FIG. 6A illustrates the graph of displacement of the bendable substrate of the oscillating accelerometer of FIG. 1 and the pulse signal of the example oscillating accelerometer of FIG. 3 as a function of time with no externally applied acceleration.

FIG. 6A includes a graph 601 and a graph 600. Graph 601 includes portions of graph 200. Graph 600 includes a y-axis 602, an x-axis 604 and a function having a pulse 606, a pulse 608 and a pulse 610. Y-axis 602 corresponds to voltage at output terminal 310, whereas X-axis 604 corresponds to time.

Returning to FIG. 3, consider a first situation wherein no acceleration is influencing flexible bridge portion 304. In such a case, flexible bridge portion 304 oscillates in accordance with the driving signal provided by driver 302. The movement of center location 316 is illustrated in graph 601 of FIG. 6A as function 206.

Returning to FIG. 3, let a position of center location 316 correspond to a distance of zero in graph 200 of FIG. 6A. When there is no external acceleration influencing flexible bridge portion 304, center location 316 will oscillate equally between a maximum distance (a maximum positive distance) and a minimum distance (maximum negative distance) with respect to an axis between support 312 and support 314. For purposes of evaluating the oscillation, let the time period for which center location falls below the axis between support 312 and support 314 be $t_1$. As shown in FIG. 6A, $t_1$ corresponds to the distance between point 214, where function 206 crosses dashed line 210, and point 216, where function 206 again crosses dashed line 212.

When center location 316 falls sufficiently below the axis between support 312 and support 314, the curvature of bendable substrate 402 will be sufficient to enable top portion 414 of post 404 to contact top portion 418 of post 406 as shown in FIG. 5. In this situation, current 504 provided by driver 302 conducts from conductive layer 408 to conductive layer 410, and continues to processor 306. The current is detected until the curvature of bendable substrate 402 is insufficient to enable top portion 414 of post 404 to contact top portion 418 of post 406 as shown in FIG. 5. As such, a pulse 606 of current is detected by processor 306 as shown in FIG. 6A.

Pulse 606 has a pulse width $PW_1$, which is a function of the size of gap 424, the height of posts 404 and 406, the material of bendable substrate 402, the thickness of bendable substrate 402 and the length of bendable substrate 402.

When center location 316 continues through the oscillation into a positive direction above the axis between support 312 and support 314, the curvature of bendable substrate is such that top portion 414 of post 404 is spread away from top portion 418 of post 406. As the oscillation continues, pulses are detected by processor 306 when gap 424 is sufficiently below the axis between support 312 and support 314, as shown for example as pulse 608 and pulse 610. The period Δ of the detected pulses is based on the material of bendable substrate 402, the thickness of bendable substrate 402 and the length of bendable substrate 402.

Therefore, in accordance with aspects of the disclosed embodiments, a sufficiently large current is provided directly to a processor, which may include a time-to-digital-converter (TDC), without a need for amplification. Further, posts 404 and 406 provide minimum perturbation on the motion of the oscillating mass, in this case bendable substrate 402. More importantly, this system can easily detect accelerations. This will be described with additional reference to FIGS. 6B-6C.

Now consider a second situation where a negative external acceleration influences flexible bridge portion 304. For example, as shown in FIG. 3, let a negative external acceleration having a particular magnitude indicated by arrow 318. This will be described with reference to FIG. 6B.

Figure 6B:
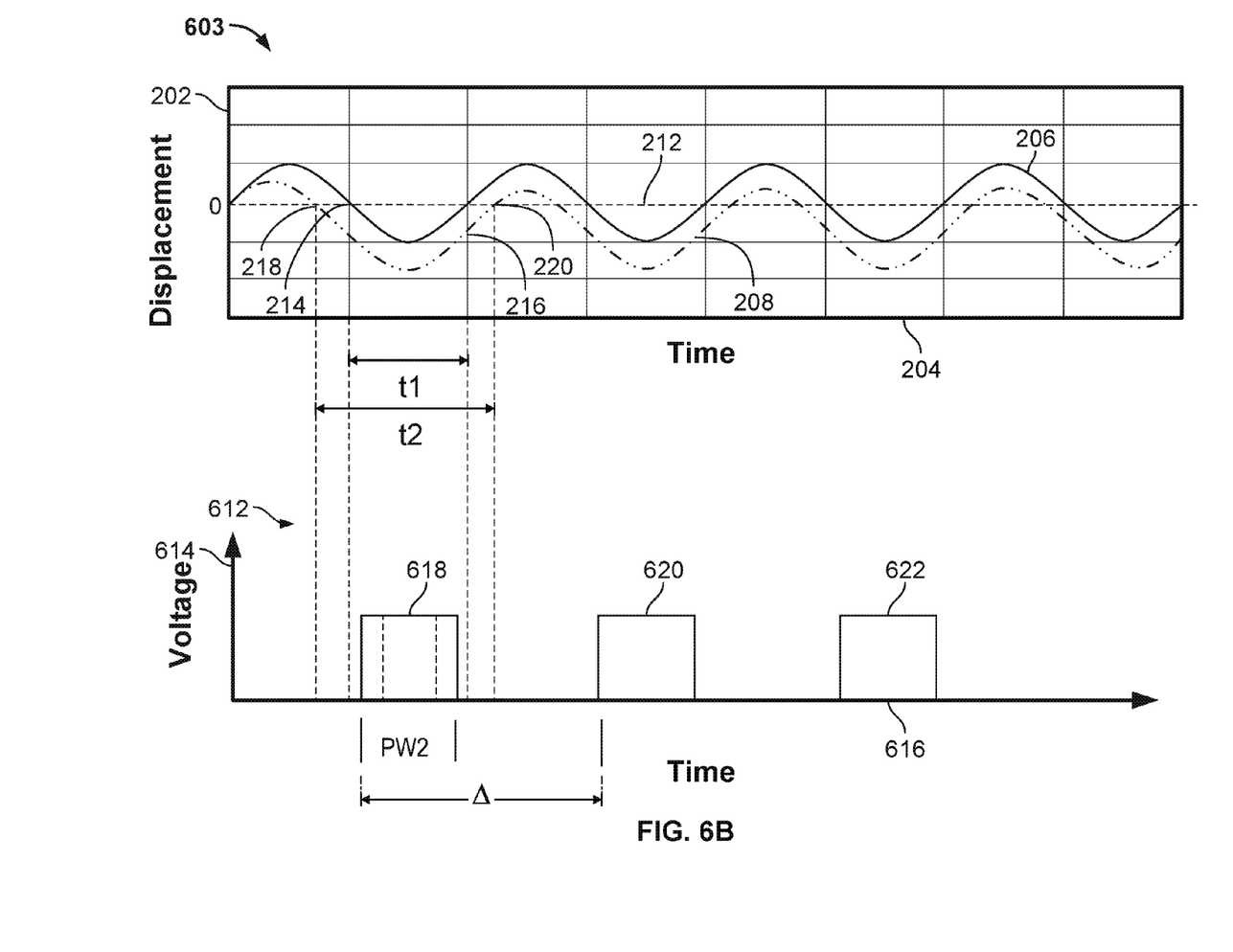
FIG. 6B illustrates the graph of amplitude as a function of time of displacement of the flexible bridge portion of the oscillating accelerometer of FIG. 1 and the pulse signal of the example oscillating accelerometer of FIG. 3 with a first externally applied acceleration.

FIG. 6B illustrates the graph of amplitude as a function of time of displacement of the bendable substrate of the oscillating accelerometer of FIG. 3 and the pulse signal of the example oscillating accelerometer of FIG. 3 with a first externally applied acceleration.

FIG. 6B includes a graph 603 and a graph 612. Graph 603 includes portions of graph 200. Graph 612 includes a y-axis 614, an x-axis 616 and a function having a pulse 618, a pulse 620 and a pulse 622. Y-axis 614 corresponds to voltage at output terminal 310, whereas X-axis 616 corresponds to time.

When there is a negative external acceleration influencing flexible bridge portion 304, center location 316 will not oscillate equally between a maximum distance and a minimum distance with respect to the axis between support 312 and support 314. This movement is illustrated in graph 603 as function 208. For example as shown in FIG. 6B, the axis between support 312 and support 314 is effectively shifted further below dashed line 212. Accordingly, center location 316 will oscillate such that the positive distance with respect to the axis between support 312 and support 314 is much less than the negative distance with respect to the axis between support 312 and support 314.

For purposes of evaluating the oscillation, let the time period for which center location 316 falls below the axis between support 312 and support 314 be $t_2$. As shown in FIG. 6B, $t_2$ corresponds to the distance between point 218, where function 208 crosses dotted-dashed line 208, and point 220, where function 208 again crosses dotted-dashed line 208.

As discussed above, when center location 316 falls sufficiently below the axis between support 312 and support 314, the curvature of bendable substrate 402 will enable top portion 414 of post 404 to contact top portion 418 of post 406 as shown in FIG. 5. In the case wherein an acceleration 318 is influencing bendable substrate 402, a pulse 618 of current is detected by processor 306 as shown in FIG. 6B.

Pulse 618 has a pulse width $PW_2$, which is greater than $PW_1$ as shown by the dashed pulse in the figure. $PW_2 > PW_1$ because acceleration 318 effectively forces more curvature into bendable substrate 402 such that top portion 414 of post 404 remains in contact with top portion 418 of post 406 for a longer time.

It should be noted however that Δ of the detected pulses remains the same as when no acceleration is detected because Δ is based on the material of bendable substrate 402, the thickness of bendable substrate 402 and the length of bendable substrate 402. By comparing $PW_1$ with $PW_2$, processor 306 can measure the magnitude of acceleration 318.

Now consider a third situation where a positive external acceleration influences flexible bridge portion 304. For example, as shown in FIG. 3, let a positive external acceleration having a particular magnitude indicated by arrow 320. This will be described with reference to FIG. 6C.

Figure 6C:
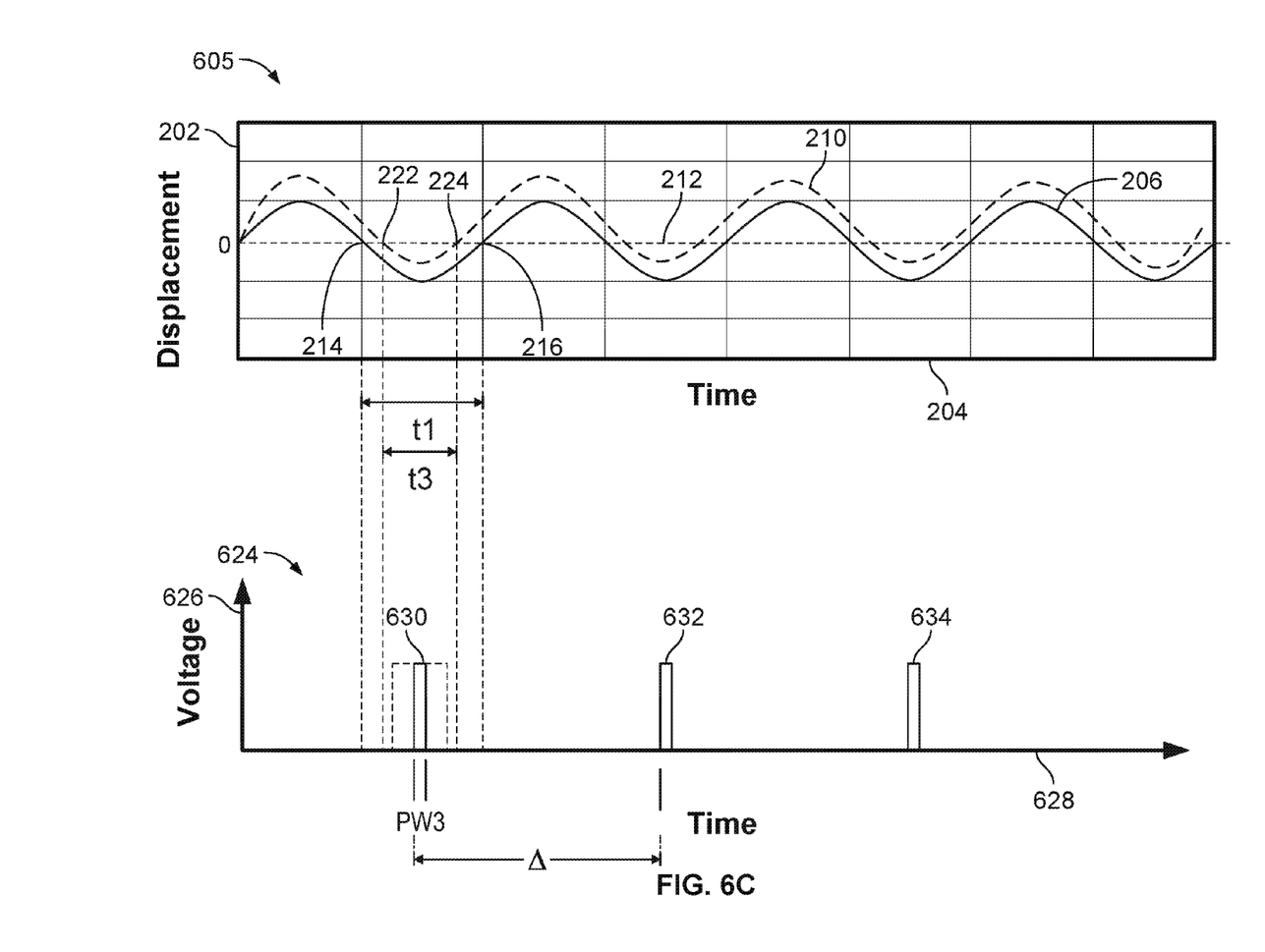
FIG. 6C illustrates the graph of amplitude as a function of time of displacement of the flexible bridge portion of the oscillating accelerometer of FIG. 1 and the pulse signal of the example oscillating accelerometer of FIG. 3 with a second externally applied acceleration.

FIG. 6C illustrates the graph of displacement of the bendable substrate of the oscillating accelerometer of FIG. 3 and the pulse signal of the example oscillating accelerometer of FIG. 3 as a function of time with a second externally applied acceleration.

FIG. 6C includes a graph 605 and a graph 624. Graph 605 includes portions of graph 200. Graph 624 includes a y-axis 626, an x-axis 628 and a function having a pulse 630, a pulse 632 and a pulse 634. Y-axis 626 corresponds to voltage at output terminal 310, whereas X-axis 628 corresponds to time.

When there is a positive external acceleration influencing flexible bridge portion 304, center location 316 will not oscillate equally between a maximum distance and a minimum distance with respect to the axis between support 312 and support 314. This movement is illustrated in graph 605 as function 210. For example as shown in FIG. 6C, the axis between support 312 and support 314 is effectively shifted further above dashed line 212. Accordingly, center location 316 will oscillate such that the positive distance with respect to the axis between support 312 and support 314 is much greater than the negative distance with respect to the axis between support 312 and support 314.

For purposes of evaluating the oscillation, let the time period for which center location 316 falls below the axis between support 312 and support 314 be $t_3$. As shown in FIG. 6C, $t_3$ corresponds to the distance between point 222, where function 210 crosses dashed-dotted line 212, and point 224, where function 210 again crosses dashed-dotted line 212.

Again, as discussed above, when center location 316 falls sufficiently below the axis between support 312 and support 314, the curvature of bendable substrate 402 will be sufficient to enable top portion 414 of post 404 to contact top portion 418 of post 406 as shown in FIG. 5. In the case wherein acceleration 320 is influencing bendable substrate 402, a pulse 630 of current is detected by processor 306 as shown in FIG. 6C.

Pulse 630 has a pulse width $PW_3$, which is less than $PW_1$ as shown by the dashed pulse in the figure. $PW_3 < PW_1$ because acceleration 320 effectively forces less curvature into bendable substrate 402 such that top portion 414 of post 404 remains in contact with top portion 418 of post 406 for a shorter time.

It should be noted however that Δ of the detected pulses remains the same as when no acceleration is detected because Δ is based on the material of bendable substrate 402, the thickness of bendable substrate 402 and the length of bendable substrate 402.

By comparing $PW_1$ with $PW_3$, processor 306 can measure the magnitude of acceleration 320.

In the example embodiment discussed above with reference to FIGS. 3-6C, a single flexible bridge portion is implemented to detect acceleration. However, in other embodiments, multiple flexible bridge portions may be used to measure a magnitude of detected acceleration. This will be described with additional reference to FIGS. 7-9.

Figure 7:
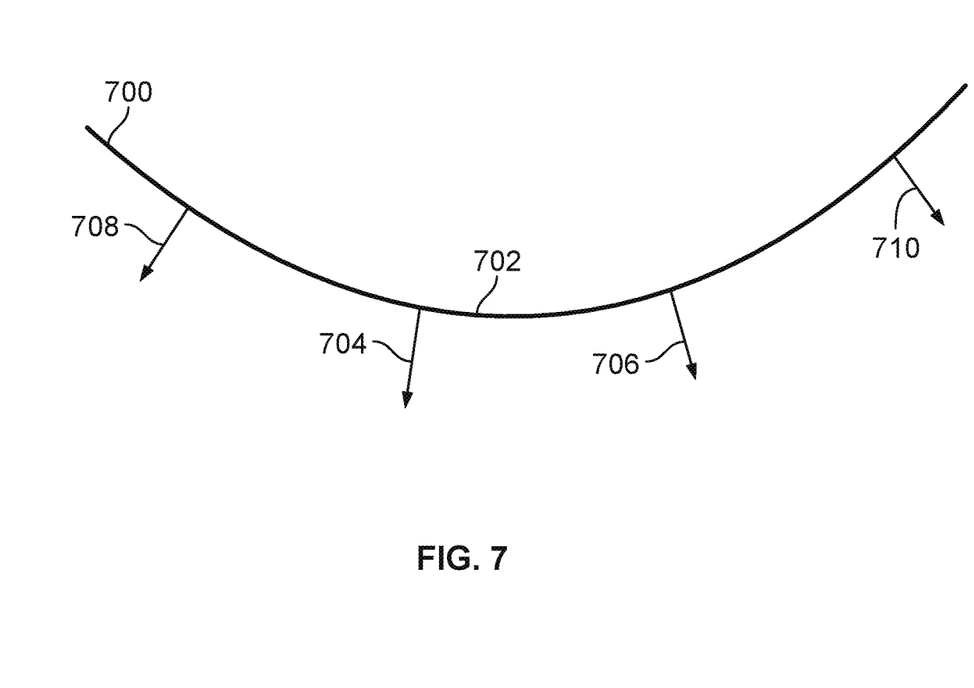
FIG. 7 illustrates the curvature of a catenary.

FIG. 7 illustrates the curvature 700 of a catenary. As shown in the figure, curvature 700 is maximized at center point 702. Curvature traveling away from center point 702. Vector arrows 704, 706, 708 and 710 represent the decrease in curvature as the distance increases from center point 702. The change in curvature of a catenary may be utilized to more accurately measure acceleration. This will be described in greater detail with reference to FIGS. 8A-9.

Figure 8A:
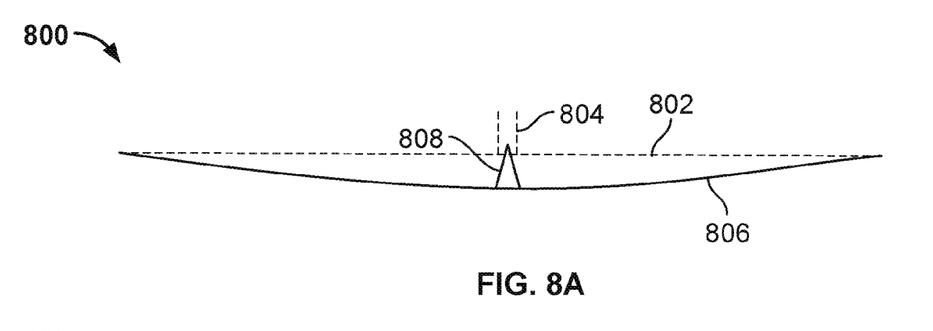
FIGS. 8A-C illustrate different curvatures of a flexible bridge portion in accordance with aspects of the disclosed embodiments.
Figure 8B:
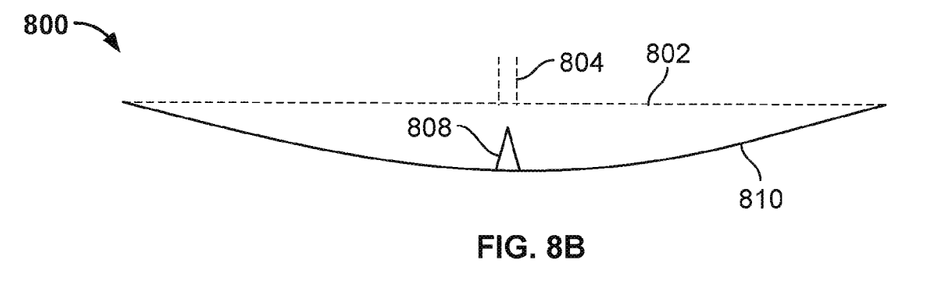
Figure 8C:
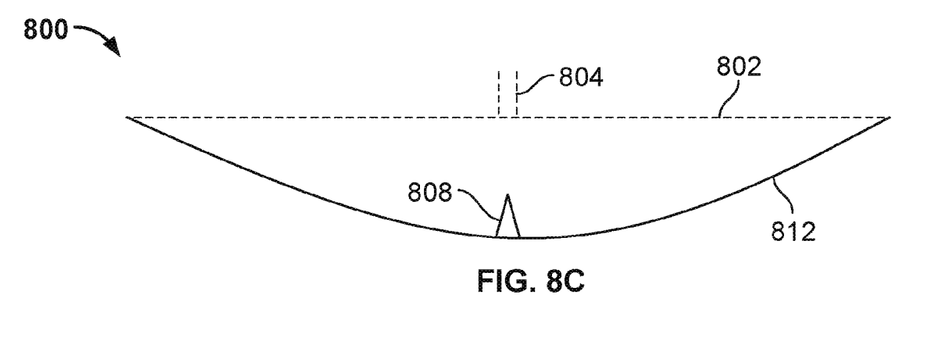

FIGS. 8A-C illustrate a flexing bendable substrate 800 having a dual post contact switch 804 centrally located thereon, wherein FIG. 8A shows a first curvature, FIG. 8B shows a second greater curvature and FIG. 8C shows a third greatest curvature.

As shown in FIG. 8A, a resting position of bendable substrate 800 is dotted line 802, whereas the resting position of dual post contact switch 804 is additionally dotted. However, when curved, as shown as line 806, dual post contact switch 804 is now connected as shown as contacting lines 808.

As shown in FIG. 8B, the greater curvature of bendable substrate 800 is illustrated as line 810. Further, when curved this amount, dual post contact switch remains connected as shown as contacting lines 808.

Furthermore, as shown in FIG. 8C, the greatest curvature of bendable substrate 800 is illustrated as line 812. Further, when curved this amount, dual post contact switch still remains connected as shown as contacting lines 808.

It is clear from FIGS. 8A-C, that a processor receiving a pulse signal (for example, as discussed above with reference to FIGS. 6A-C) would be unable to determine the magnitude of the influencing acceleration. This issue may be addressed by moving the dual post contact switch from the center of the bendable substrate. This will be described in greater detail with reference to FIG. 9.

Figure 9:
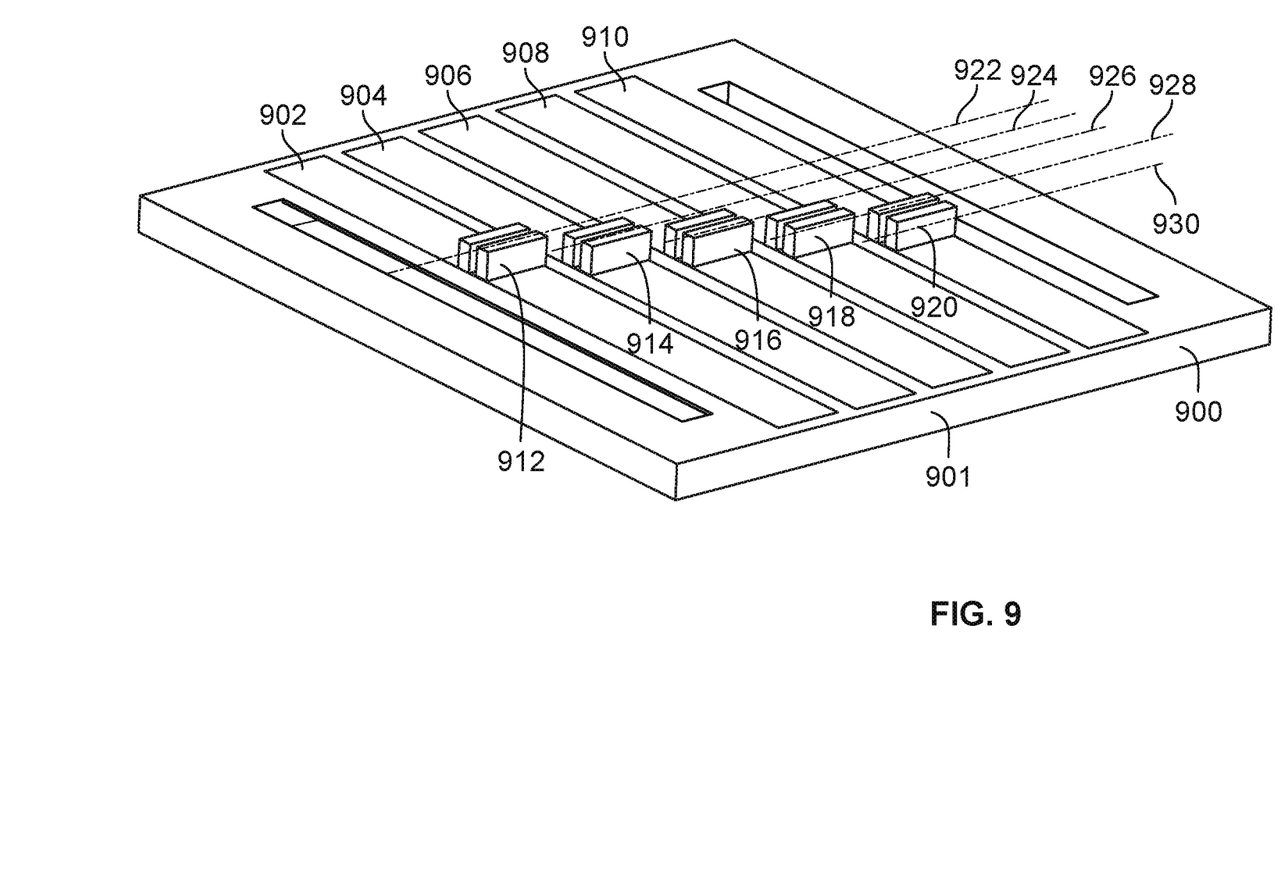
FIG. 9 illustrates another example oscillating accelerometer in accordance with aspects of the disclosed embodiments.

FIG. 9 illustrates another example oscillating accelerometer 900 in accordance with aspects of the disclosed embodiments. As shown in the figure, oscillating accelerometer 900 includes a support 901, a bendable substrate 902, a bendable substrate 904, a bendable substrate 906, a bendable substrate 908 and a bendable substrate 910. Each of bendable substrates 902, 904, 906, 908 and 910 have a dual, bendable post contact switch 912, 914, 916, 918, and 920, disposed thereon respectively.

Bendable substrates 902, 904, 906, 908 and 910 are arranged in parallel. Bendable post contact switch 912 is centrally disposed on bendable substrate 902, as shown by dotted line 922. Bendable post contact switch 914 is disposed a first distance from the center of bendable substrate 904, as shown by dotted line 924. Bendable post contact switch 916 is disposed a second distance from the center of bendable substrate 904, as shown by dotted line 926. Bendable post contact switch 918 is disposed a third distance from the center of bendable substrate 904, as shown by dotted line 928. Bendable post contact switch 920 is disposed a fourth distance from the center of bendable substrate 904, as shown by dotted line 930.

Oscillating accelerometer 900 is able to detect multiple levels of bending. In particular, each bendable post contact switch 912, 914, 916, 918, and 920 is able to provide a signal associated with a different level of curvature. A processor may then process the signals provided by each of bendable substrates 902, 904, 906, 908 and 910 to determine a magnitude of the influencing acceleration.

The above discussed example embodiments are non-limiting examples of aspects of the disclosed system. In should be noted that in other embodiments, the bendable surface can be a cantilever, a flexible bridge, or any form of spring bending as part of the mass-on-a-spring harmonic oscillator. Further, in other embodiments, the post may be a metal coated dielectric or made entirely of metal. Still further, in some embodiments, more than one switch may be mounted on any given bendable surface.

Conventional cantilevered proof mass proximity switches that are used to detect acceleration either require their output signals to be amplified prior to processing and or provide large perturbation on the motion of the oscillating mass. An accelerometer in accordance with aspects of the disclosed embodiments includes a flexible substrate having a two post contact switch thereon. When the flexible substrate bends such that the curvature hits a predetermined amount, the two post contact switch closes, thus passing a signal.

A benefit of the accelerometer in accordance with aspects of the disclosed embodiments is that the output signal does not need to be amplified prior to processing, and there is minimal perturbation on the motion of the oscillating mass.

This design creates a low resistance on state which would not require amplification before use as a digital trigger. This would eliminate any timing jitter associated with the amplification.

The foregoing description of various embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A device comprising:
   an input terminal configured to receive an electrical input;
   an output terminal configured to output an electrical output;
   a support structure having a first support end and a second support end;
   a flexible bridge portion having a first end disposed at the first support end, having a second end disposed at the second support end and in electrical connection with the output terminal, and having a length from the first end to the second end, wherein the flexible bridge portion comprises a flexible substrate having a top surface, a first non-conductive post disposed normal the top surface, a second non-conductive post disposed normal on the top surface at distance d from the first non-conductive post, a first conductive layer covering the top surface from the first end to a portion of the first non-conductive post and in electrical connection with the input terminal, a second conductive layer covering the top surface from the second end to a portion of the second non-conductive post and in electrical connection with the output terminal, wherein the first non-conductive post comprises a first mounting end disposed at the top surface and a first top end separated from the mounting end, the first top end being covered by the first conductive layer, wherein the second non-conductive post comprises a second mounting end disposed at the top surface and a second top end separated from the mounting end, the second top end being covered by the second conductive layer, wherein when the flexible bridge concavely bends with respect to the top surface by a predetermined curvature, C, the first conductive layer on the first top end electrically connects with the second conductive layer on the second top end.

2. The device of claim 1, wherein the first non-conductive post and the second non-conductive post are centrally disposed between the first end and the second end.

3. The device of claim 2 further comprising a driver configured to generate an oscillating driving signal as the electrical input.

4. The device of claim 3, wherein the first conductive layer is selected from the group consisting of Ag, Au, Cu, Al, and combinations thereof.

5. The device of claim 4 further comprising a second flexible bridge portion comprising a second flexible substrate having a second top surface, a third non-conductive post, a fourth non-conductive post, a third conductive layer and a fourth conductive layer, wherein the third non-conductive post comprises a third top end covered by the third conductive layer, wherein the fourth non-conductive post comprises a fourth top end covered by the fourth conductive layer, wherein when the second flexible bridge concavely bends with respect to the second top surface by a second predetermined curvature, $C_2$, the third conductive layer on the third top end electrically connects with the fourth conductive layer on the fourth top end.

6. The device of claim 5, wherein the third non-conductive post and the fourth non-conductive post are not centrally disposed between the first end and the second end.

7. The device of claim 6, wherein the third conductive layer is selected from the group consisting of Ag, Au, Cu, Al, and combinations thereof.

8. The device of claim 7, wherein the first conductive layer and the third conductive layer comprise the same material.

9. The device of claim 1 further comprising a driver configured to generate an oscillating driving signal as the electrical input.

10. The device of claim 9, wherein the first conductive layer is selected from the group consisting of Ag, Au, Cu, Al, and combinations thereof.

11. The device of claim 10 further comprising a second flexible bridge portion comprising a second flexible substrate having a second top surface, a third non-conductive post, a fourth non-conductive post, a third conductive layer and a fourth conductive layer, wherein the third non-conductive post comprises a third top end covered by the third conductive layer, wherein the fourth non-conductive post comprises a fourth top end covered by the fourth conductive layer, wherein when the second flexible bridge concavely bends with respect to the second top surface by a second predetermined curvature, $C_2$, the third conductive layer on the third top end electrically connects with the fourth conductive layer on the fourth top end.

12. The device of claim 11, wherein the third non-conductive post and the fourth non-conductive post are not centrally disposed between the first end and the second end.

13. The device of claim 12, wherein the third conductive layer is selected from one of the group consisting Ag, Au, Cu, Al and combinations thereof.

14. The device of claim 13, wherein the first conductive layer and the third conductive layer comprise the same material.

15. The device of claim 1, further comprising a second flexible bridge portion comprising a second flexible substrate having a second top surface, a third non-conductive post, a fourth non-conductive post, a third conductive layer and a fourth conductive layer, wherein the third non-conductive post comprises a third top end covered by the third conductive layer, wherein the fourth non-conductive post comprises a fourth top end covered by the fourth conductive layer, wherein when the second flexible bridge concavely bends with respect to the second top surface by a second predetermined curvature, C2, the third conductive layer on the third top end electrically connects with the fourth conductive layer on the fourth top end.

16. The device of claim 15, wherein the third non-conductive post and the fourth non-conductive post are not centrally disposed between the first end and the second end.

17. The device of claim 16, wherein the third conductive layer is selected from the group consisting of Ag, Au, Cu, Al, and combinations thereof.

18. The device of claim 17, wherein the first conductive layer and the third conductive layer comprise the same material.

19. A method comprising the steps of:
generating, via a driver, an oscillating driving signal;
receiving, via an input terminal, the oscillating driving signal;
oscillating, via the oscillating driving signal, a bendable cantilever device supported between a first support end and a second support end, the bendable cantilever device including a flexible bridge portion having a first end disposed at the first support end, having a second end disposed at the second support end and in electrical connection with an output terminal, the flexible bridge portion having a length from the first end to the second end, the flexible bridge portion comprises a flexible substrate having a top surface, a first non-conductive post disposed normal the top surface, a second non-conductive post disposed normal on the top surface at distance d from the first non-conductive post, a first conductive layer covering the top surface from the first end to a portion of the first non-conductive post and in electrical connection with the input terminal, a second conductive layer covering the top surface from the second end to a portion of the second non-conductive post and in electrical connection with the output terminal; and
detecting, via a processor, an acceleration based on a change in oscillation of the bendable cantilever device, wherein the first non-conductive post comprises a first mounting end disposed at the top surface and a first top end separated from the mounting end, the first top end being covered by the first conductive layer, wherein the second non-conductive post comprises a second mounting end disposed at the top surface and a second top end separated from the mounting end, the second top end being covered by the second conductive layer, wherein when the flexible bridge concavely bends with respect to the top surface by a predetermined curvature, C, the first conductive layer on the first top end electrically connects with the second conductive layer on the second top end.

\* \* \* \* \*